(12) United States Patent
Geiser et al.

(10) Patent No.: US 10,634,187 B2
(45) Date of Patent: Apr. 28, 2020

(54) THRUST BEARING ARRANGEMENT

(71) Applicant: Schaeffler Technologies AG & Co. KG, Herzogenaurach (DE)

(72) Inventors: Jordan Geiser, Dalton, OH (US); Michael Hodge, Creston, OH (US); James Brown, Rock Hill, SC (US); Alicia Vidal Ortiz, Puebla (MX); Charles Schwab, Fort Mill, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/879,161

(22) Filed: Jan. 24, 2018

(65) Prior Publication Data

US 2019/0226521 A1    Jul. 25, 2019

(51) Int. Cl.
*F16C 27/08*    (2006.01)
*F16C 19/10*    (2006.01)
(Continued)

(52) U.S. Cl.
CPC .............. *F16C 27/08* (2013.01); *F16C 19/10* (2013.01); *F16C 43/04* (2013.01); *F16C 33/588* (2013.01); *F16C 2361/65* (2013.01)

(58) Field of Classification Search
CPC .......... F16C 19/10; F16C 19/12; F16C 19/22; F16C 19/30; F16C 19/305; F16C 19/32; F16C 19/44; F16C 19/46; F16C 19/463; F16C 27/04; F16C 27/08; F16C 25/00; F16C 25/08; F16C 25/083; F16C 35/04; F16C 35/042; F16C 35/06; F16C 35/077; F16C 2361/61; F16C 43/00; F16C 43/04; F16C 2361/65; F16C 33/588; F16C 2326/06; F16D 23/00; F16D 23/14
See application file for complete search history.

(56) References Cited

U.S. PATENT DOCUMENTS 3,317,014 A * 5/1967 Pitner ..................... F16C 19/30
                                                      192/98
3,805,972 A * 4/1974 Pitner ..................... F16C 19/30
                                                      206/509
(Continued)

FOREIGN PATENT DOCUMENTS

EP    0709589 B1    6/1999
JP    2012159091 A    8/2012

OTHER PUBLICATIONS

U.S. Appl. No. 15/673,975, filed Aug. 10, 2017 (unpublished).
U.S. Appl. No. 15/671,545, filed Aug. 8, 2017 (unpublished).

*Primary Examiner* — Alan B Waits
(74) *Attorney, Agent, or Firm* — Volpe and Koenig, P.C.

(57) ABSTRACT

A method of assembling a thrust bearing arrangement is disclosed. The method includes (a) providing a thrust bearing assembly. The thrust bearing assembly includes a support washer. The support washer includes a radially outer rim defining a plurality of slots extending radially outward from the radially outer rim. The method includes (b) providing a spring plate. The spring plate includes projections at a radially outer region. The projections extend in an axial direction. The method includes (c) aligning the projections of the spring plate with the slots of support washer. The method includes (d) deforming the projections of the spring plate to retain the thrust bearing assembly with the spring plate.

7 Claims, 9 Drawing Sheets

(51) Int. Cl.
*F16C 43/04* (2006.01)
*F16C 33/58* (2006.01)

(56) References Cited

U.S. PATENT DOCUMENTS

| | | | | |
|---|---|---|---|---|
| 4,042,285 A * | 8/1977 | Dorsch | ............... | F16C 19/30 384/621 |
| 4,883,374 A | 11/1989 | Rhoads et al. | | |
| 5,007,746 A | 4/1991 | Matzelle et al. | | |
| 5,489,255 A * | 2/1996 | Hinckley | ............... | F16C 19/30 384/620 |
| 5,584,585 A | 12/1996 | Premiski et al. | | |
| 5,846,001 A * | 12/1998 | Muntnich | ............... | F16C 19/30 384/620 |
| 5,918,987 A | 7/1999 | Sundquist et al. | | |
| 5,927,870 A * | 7/1999 | Kranz | ............... | F16C 19/30 384/622 |
| 5,967,673 A * | 10/1999 | Kenney, Jr. | ............ | F16C 19/30 384/620 |
| 5,967,674 A * | 10/1999 | Reubelt | ............... | F16C 19/30 384/620 |
| 6,533,461 B2 * | 3/2003 | Gottlieb | ............... | F16C 19/30 384/255 |
| 6,857,787 B1 * | 2/2005 | Meier | ............... | F16C 19/10 384/619 |
| 7,318,676 B2 * | 1/2008 | Fugel | ............... | F16C 19/30 384/620 |
| 8,348,515 B2 * | 1/2013 | Fugel | ............... | F16C 33/588 384/620 |
| 9,618,047 B2 * | 4/2017 | Malik | ............... | F16C 19/30 |
| 9,765,871 B2 * | 9/2017 | Simon | ............... | F16H 41/24 |
| 2005/0008501 A1 * | 1/2005 | Fredericksen | ...... | F04B 27/1063 417/269 |
| 2006/0193549 A1 * | 8/2006 | Fugel | ............... | F16C 19/30 384/620 |
| 2015/0369292 A1 * | 12/2015 | Malik | ............... | F16C 19/30 384/618 |
| 2016/0131202 A1 * | 5/2016 | Lee | ............... | F16D 23/145 192/70.22 |
| 2017/0211620 A1 | 7/2017 | Brzezinski et al. | | |
| 2018/0266483 A1 * | 9/2018 | Shimpo | ............... | F16C 33/62 |

* cited by examiner

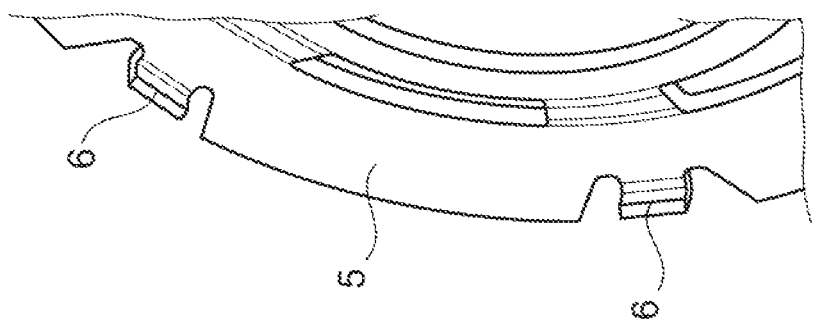
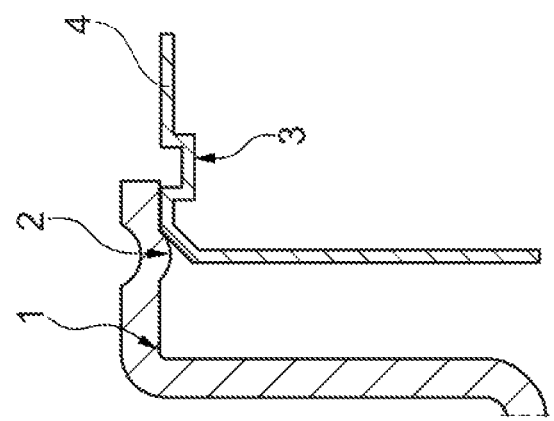
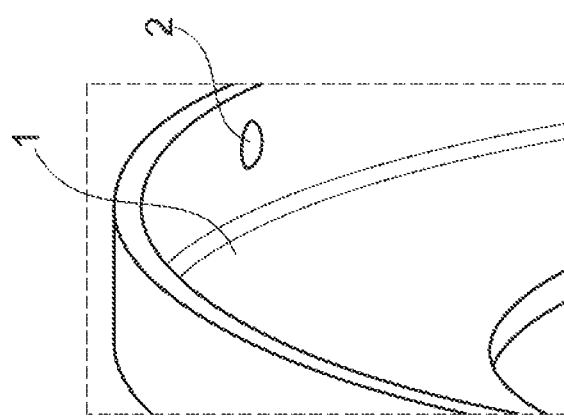

THRUST BEARING ARRANGEMENT

FIELD OF INVENTION

This invention is generally related to a thrust bearing, and is more particularly related to a thrust bearing assembly with a spring plate.

BACKGROUND

Thrust bearings are used in a wide range of applications for supporting axial loads. One particular application for thrust bearings includes transmission arrangements, which require relative movement between components and support of axial loads. Known thrust bearings for transmission arrangements are typically separately assembled from the associated spring plate and other transmission features. These known arrangements are difficult to assemble because the thrust bearing and the spring plate of the transmission must be centered relative to each other.

Many known stamped components in transmission arrangements include an "interrupted" guide surface for the thrust bearing, i.e. the guide is formed as a plurality of axially extending fingers around a radially outer periphery of the stamped component. One such arrangement according to the prior art including an interrupted guide is shown in FIG. 1C, showing a stamped plate 5 including guide fingers 6 along a radially outer edge of the stamped plate 5. FIGS. 1A and 1B illustrate other arrangements according to the prior art for attaching a thrust bearing to a shaft or housing. FIGS. 1A and 1B illustrate a washer plate 1 of the thrust bearing including a protrusion 2 which forms a grip tab configured to engage a corresponding groove 3 formed in a shaft or housing 4. However, if the bearing must be attached to an interrupted guidance on a stamped plate, rather than a machined shaft or housing, then these features do not provide a reliable connection and do not provide adequate centering or guidance.

It would be desirable to provide a thrust bearing arrangement that is relatively easy to assemble and center, which also provides a reliable connection between a thrust bearing assembly and a spring plate.

SUMMARY

Briefly stated, a thrust bearing arrangement and a method of assembling a thrust bearing arrangement are disclosed herein that provide improved centering and retention features.

In one embodiment, a thrust bearing arrangement is disclosed. The thrust bearing arrangement includes a thrust bearing assembly including a support washer. The support washer includes a radially outer rim defining slots extending radially outward from the radially outer rim, and each slot includes a through opening. A spring plate includes projections at a radially outer region. The projections extend in an axial direction. Each projection extends through a respective through opening to retain the thrust bearing assembly with the spring plate.

In one embodiment, a method of assembling a thrust bearing arrangement is disclosed. The method includes (a) providing a thrust bearing assembly. The thrust bearing assembly includes a support washer. The support washer includes a radially outer rim defining a plurality of slots extending radially outward from the radially outer rim. The method includes (b) providing a spring plate. The spring plate includes projections at a radially outer region. The projections extend in an axial direction. The method includes (c) aligning the projections of the spring plate with the slots of support washer, and (d) deforming the projections of the spring plate to retain the thrust bearing assembly with the spring plate.

Preferred arrangements with one or more features of the embodiments are described below and in the claims.

BRIEF DESCRIPTION OF THE DRAWINGS

The foregoing summary as well as the following detailed description will be best understood when read in conjunction with the appended drawing. In the drawings:

FIGS. 1A and 1B illustrate an attachment feature according to the prior art.

FIG. 1C illustrates a centering feature according to the prior art.

DETAILED DESCRIPTION OF THE PREFERRED EMBODIMENTS

Figure 2:
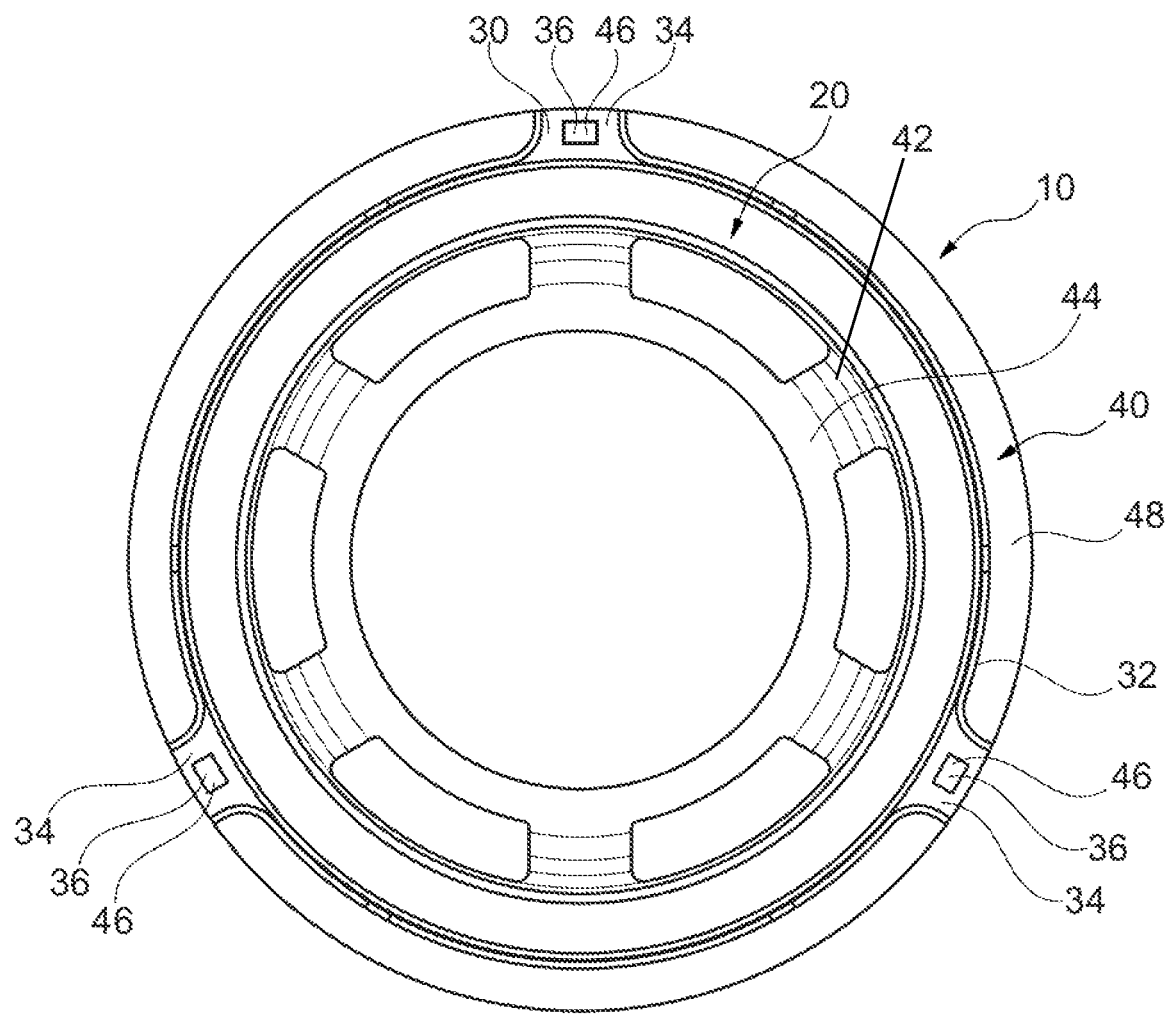
FIG. 2 illustrates a front view of a thrust bearing arrangement according to one embodiment.
Figure 3:
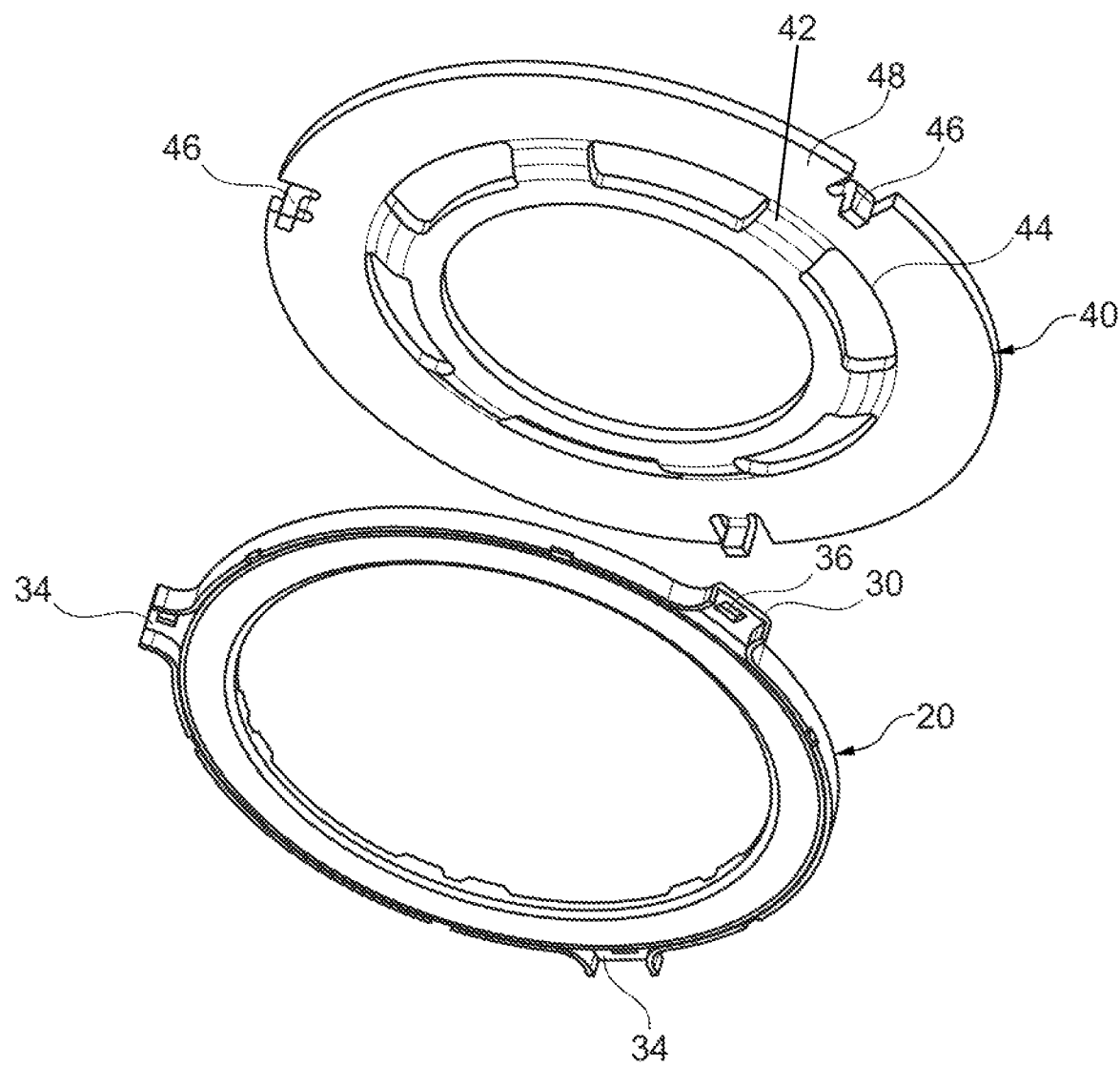
FIG. 3 illustrates a front perspective view of the thrust bearing arrangement of FIG. 2 in a pre-assembled state.
Figure 4:
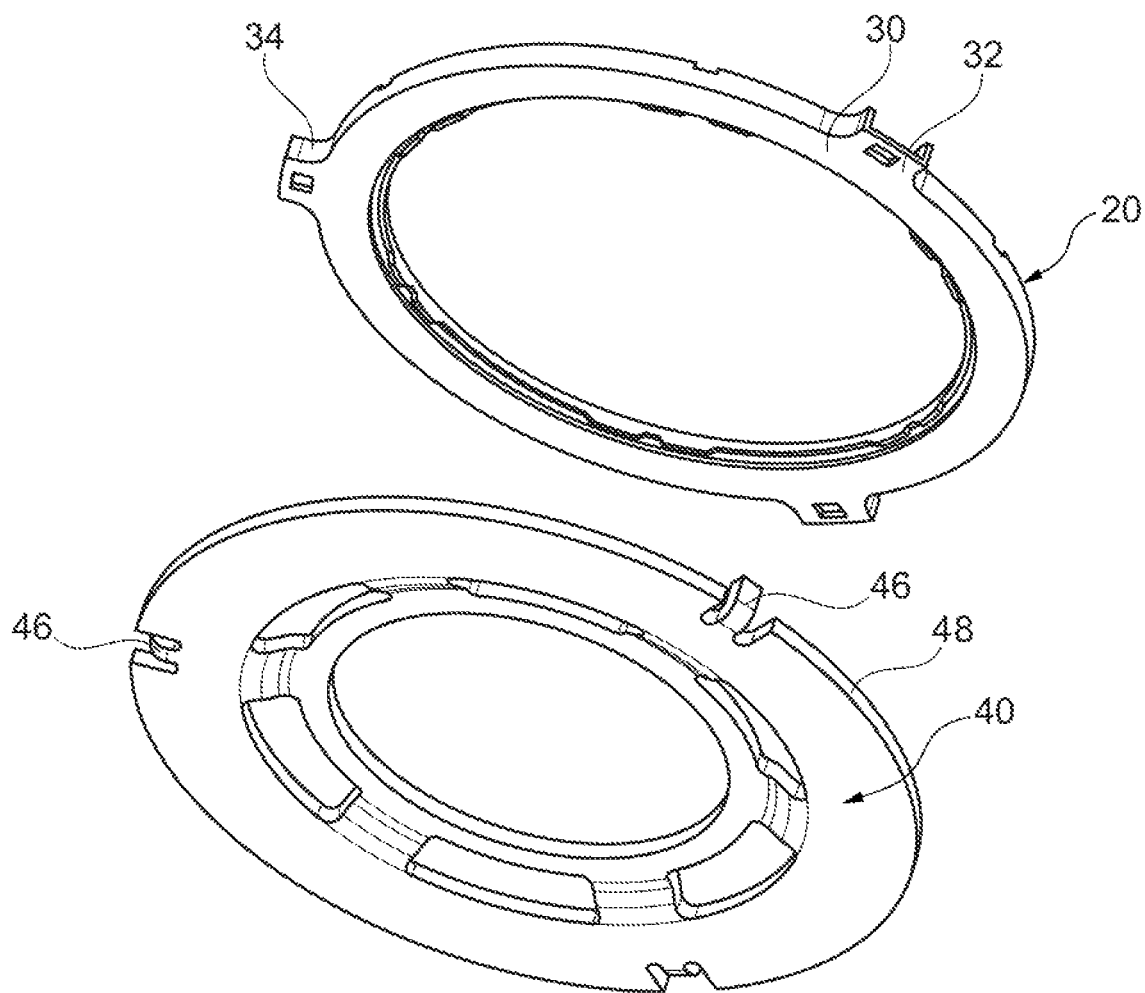
FIG. 4 illustrates a rear perspective view of the thrust bearing arrangement of FIGS. 2 and 3 in the pre-assembled state.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

Figure 5A:
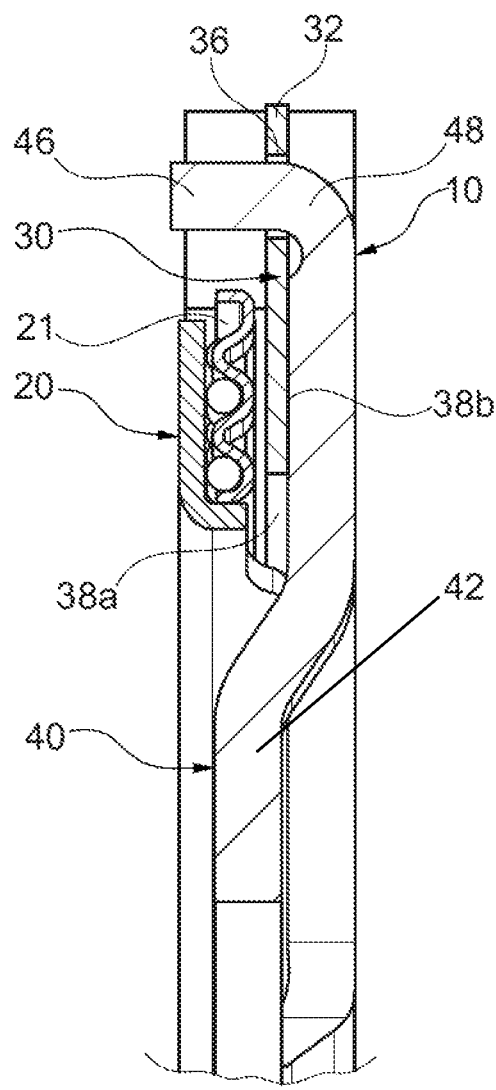
FIG. 5A illustrates a cross section view of the thrust bearing arrangement of FIGS. 2-4 in a pre-assembled state.
Figure 5B:
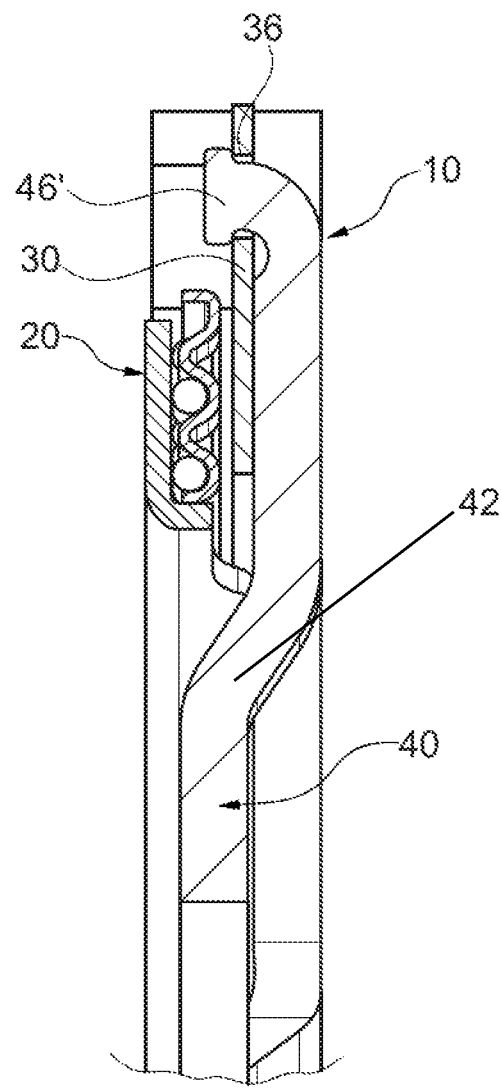
FIG. 5B illustrates a cross section view of the thrust bearing arrangement of FIGS. 2-5A in an assembled state.

FIGS. 2-5B illustrate a thrust bearing arrangement 10. The thrust bearing arrangement 10 includes a thrust bearing assembly 20, a support washer 30, and a spring plate 40. In one embodiment, the support washer 30 forms a raceway for the bearing arrangement 10. In one embodiment, the support washer 30 and the spring plate 40 are formed from stamped sheet metal. The support washer 30 includes a radially outer rim 32 defining a plurality of slots 34 extending radially outwardly from the radially outer rim 32. Each slot 34 of the plurality of slots 34 includes a through opening 36. As shown in the drawings, the support washer 30 includes three slots 34 and three through openings 36. One of ordinary skill in the art would recognize from the present disclosure that additional slots 34 and through openings 36 can be provided. At least three slots 34 and at least three through openings 36 are used to provide a reliable connection with the spring plate 40 and proper alignment between the support washer 30 and the spring plate 40. As shown in FIGS. 5A and 5B, the support washer 30 defines a support surface 38a (first axial surface) for rolling elements 21 of the thrust bearing assembly 20. One of ordinary skill in the art would understand that in another embodiment, the support washer 30 may not define a raceway for the rolling elements 21. The support surface 30 defines a second axial surface 38b (opposite from the first axial surface) that directly engages against the spring plate 40. As shown most clearly in FIGS. 5A and 5B, the support washer 30 has a thin, plate-like body, and is preferably thinner than the spring plate 40.

The spring plate 40 includes a plurality of guide tabs 42 at a radially inner region 44 and a plurality of projections 46 at a radially outer region 48. The plurality of projections 46 and the plurality of guide tabs 42 each extend in an axial direction. The plurality of guide tabs 42 define an angled surface extending in the axial direction. Lateral surfaces of the projections 46 contacting lateral surfaces of the openings 36 provides a reliable centering arrangement for centering the thrust bearing assembly 20 and the spring plate 40. As shown in FIGS. 5A and 5B, a radially inner portion of the thrust bearing assembly 20 contacts the angled surface of the guide tabs 42. In one embodiment, the guide tabs 42 help center the thrust bearing arrangement 10 relative to a transmission or differential in which the thrust bearing arrangement 10 is installed.

As best shown in FIG. 2, the guide tabs 42 extend circumferentially about the spring plate 40 for a majority of a periphery defined by the radially inner region 44 of the spring plate 40. The projections 46 preferably have a rectangular cross section, due to the spring plate 40 being formed from stamped sheet metal. Each projection 46 of the plurality of projections 46 extends through a respective through opening 36 to retain the thrust bearing assembly 20 with the spring plate 40.

In one embodiment, a method of assembling a thrust bearing arrangement 10 is provided. The method includes (a) providing a thrust bearing assembly 20. The thrust bearing assembly 20 includes at least one support washer 30, and the at least one support washer 30 includes a radially outer rim 32 defining a plurality of slots 34 extending radially outward from the radially outer rim 32. The method includes (b) providing a spring plate 40. The spring plate 40 includes a plurality of projections 46 at a radially outer region 48. The plurality of projections 46 extend in an axial direction. The method includes (c) aligning the plurality of projections 46 of the spring plate 40 with the slots 34 of the at least one support washer 30. The method includes (d) deforming the plurality of projections 46 of the spring plate 40 to retain the thrust bearing assembly 20 with the spring plate 40.

In one embodiment, step (d) of the method is performed via riveting or stamping of the projections 46, as shown in FIGS. 5A and 5B. Deformation of the projections 46 is controlled and relatively lighter and more restrained compared to a typical stamping or riveting process. As shown in FIG. 5B, after stamping, an enlarged head of the deformed projection 46' does not completely fill the slot 36, i.e. clearance is provided between the projections and the slots. This stamping operation ensures that the projection 46 is only deformed to the extent required to axially retain the spring plate 40 with the support washer 30, and does not result in any deformation of the support washer 30, which would be undesirable.

Figure 6A:
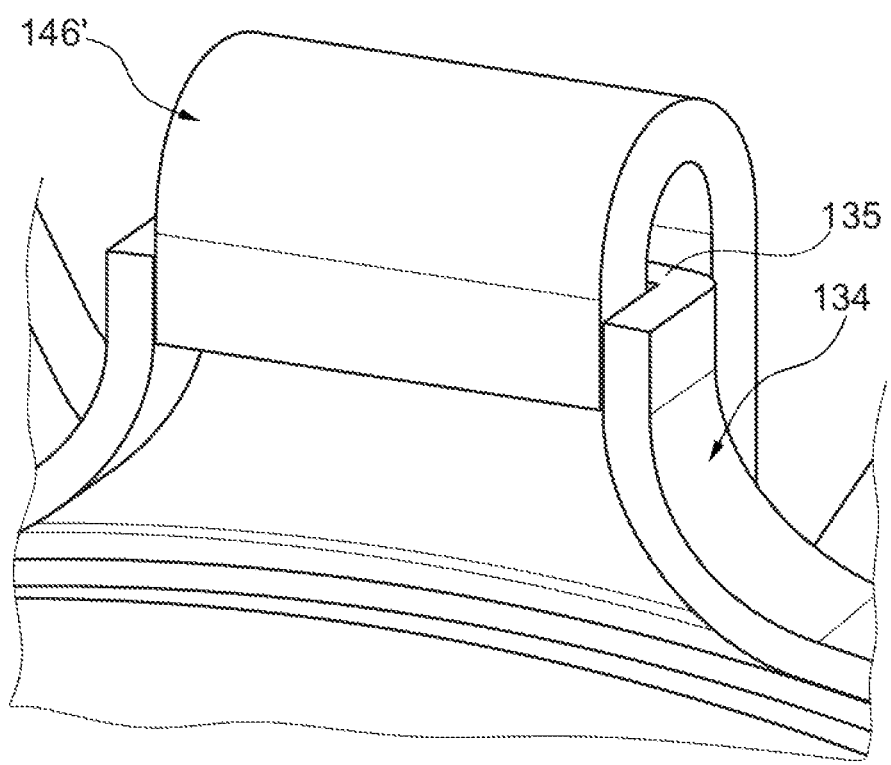
FIG. 6A is a magnified view of one embodiment of a projection of a spring plate extending around a slot of a support washer.
Figure 6B:
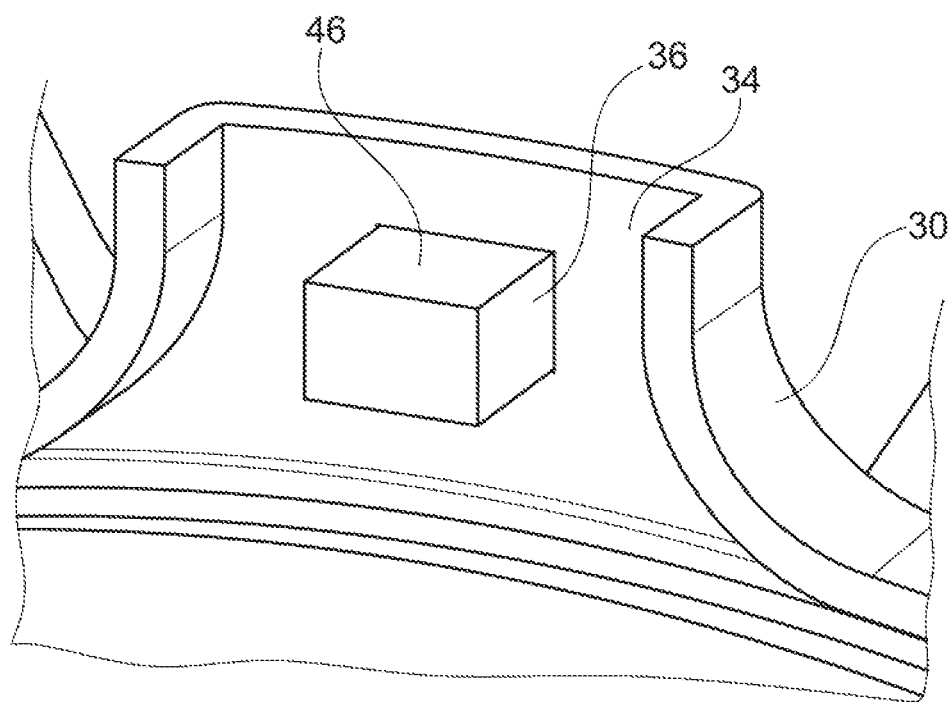
FIG. 6B is a magnified view of a projection of a spring plate extending into a through opening of a support washer
Figure 6C:
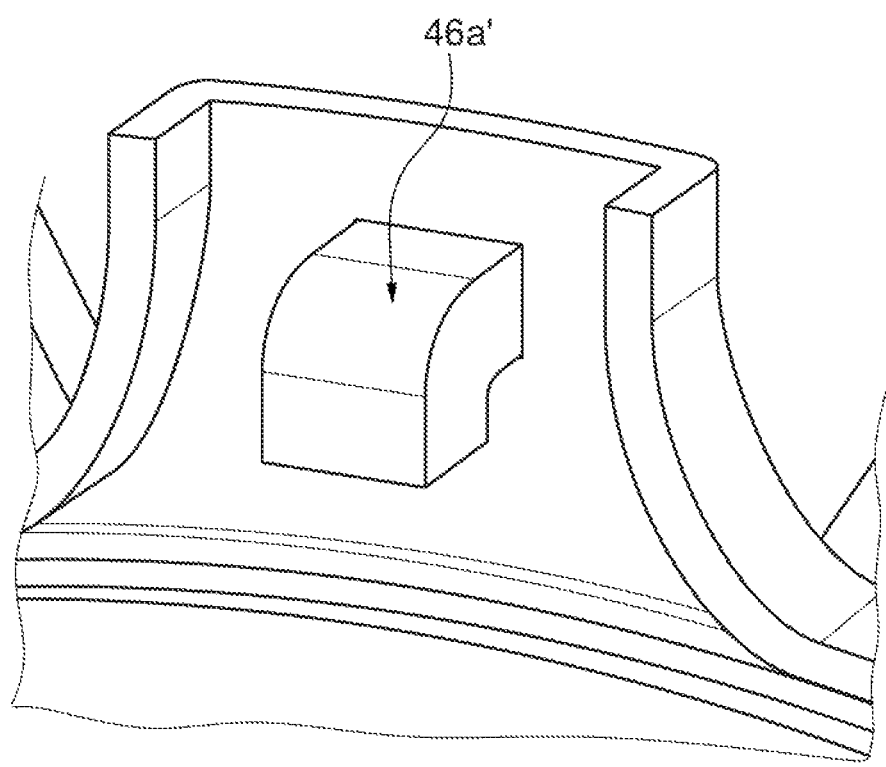
FIG. 6C is a magnified view of the embodiment of FIG. 6B with the projection bent radially inward.
Figure 6D:
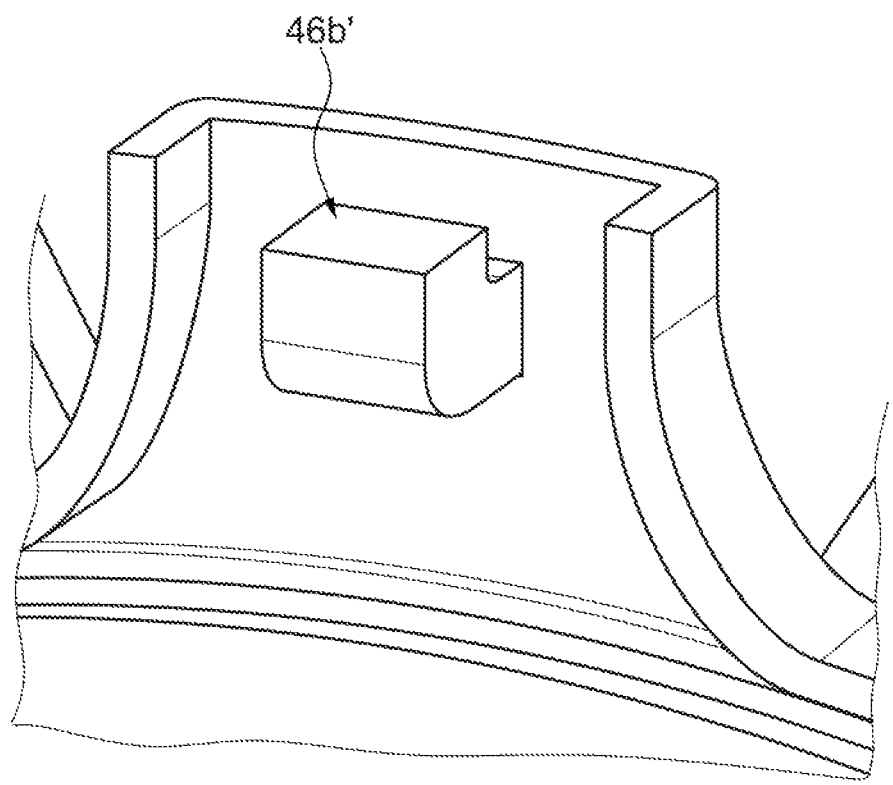
FIG. 6D is a magnified view of the embodiment of FIG. 6B with the projection bent radially outward.

In one embodiment, the projections extend radially outward before deformation (i.e. before step (d)). As shown in FIG. 6A, the projections 146' are deformed to wrap around a radially outer edge 135 of the slots 134 to retain the spring plate 40 with the thrust bearing assembly 20. In this embodiment, the slots 134 lack through openings. In one embodiment shown in FIG. 6B, each slot 34 defines a through opening 36, and the method further comprises inserting the plurality of projections 46 into the through openings before step (d). As shown in FIGS. 6C and 6D, the projections 46 can be bent radially inward 46a' or radially outward 46b' during step (d).

Although the drawings illustrate the retention features for the thrust bearing assembly 20 on an axially inward support plate, i.e. support washer 30, one of ordinary skill in the art would recognize from the present disclosure that the retention features could also be incorporated on an axially outer washer or support plate.

Having thus described various embodiments of the present thrust bearing arrangement in detail, it is to be appreciated and will be apparent to those skilled in the art that many changes, only a few of which are exemplified in the detailed description above, could be made in the thrust bearing arrangement without altering the concepts and principles embodied therein. The present embodiments are therefore to be considered in all respects as illustrative and not restrictive, the scope of the application being indicated by the appended claims rather than by the foregoing description, and all changes which come within the meaning and range of equivalency of the claims are therefore to be embraced therein.

LOG TO REFERENCE NUMBERS washer plate 1
protrusion 2
groove 3
shaft or housing 4
stamped plate 5
guide fingers 6
thrust bearing arrangement 10
thrust bearing assembly 20
rolling elements 21
support washer 30
radially outer rim 32
plurality of slots 34
through opening 36
first axial surface 38a
second axial surface 38b
spring plate 40
guide tabs 42
radially inner region 44
plurality of projections 46
radially outer region 48
slots 134
radially outer edge 135
projections 146'

What is claimed is:

1. A thrust bearing arrangement comprising:
a thrust bearing assembly including at least one support washer, the at least one support washer including a radially outer rim defining a plurality of slots extending radially outward from the radially outer rim, each slot of the plurality of slots including a through opening; and
a spring plate including both a plurality of projections at a radially outer region and a plurality of guide tabs at a radially inner region, the plurality of projections and the plurality of guide tabs both extending in a common axial direction away from the spring plate and towards the thrust bearing assembly;

each projection of the plurality of projections extending through a respective through opening to retain the thrust bearing assembly with the spring plate.

2. The thrust bearing arrangement of claim 1, wherein the at least one support washer defines a support surface for rolling elements of the thrust bearing assembly.

3. The thrust bearing arrangement of claim 1, wherein the plurality of slots includes three slots and the plurality of projections includes three projections.

4. The bearing arrangement of claim 1, wherein the at least one support washer and the spring plate are formed from stamped sheet metal.

5. The bearing arrangement of claim 1, wherein the at least one support washer defines a support surface for rolling elements of the thrust bearing assembly on a first axial surface and directly engages the spring plate on a second axial surface.

6. The bearing arrangement of claim 1, wherein the plurality of projections have a rectangular cross section.

7. The bearing arrangement of claim 1, wherein the plurality of guide tabs are each spaced from each other, and extend circumferentially around a majority of a periphery defined by the radially inner region of the spring plate.

* * * * *